June 5, 1956   M. H. EMRICK   2,749,264
METHOD OF BONDING FRICTION FACINGS TO CONICAL CUPS
Filed Nov. 9, 1953
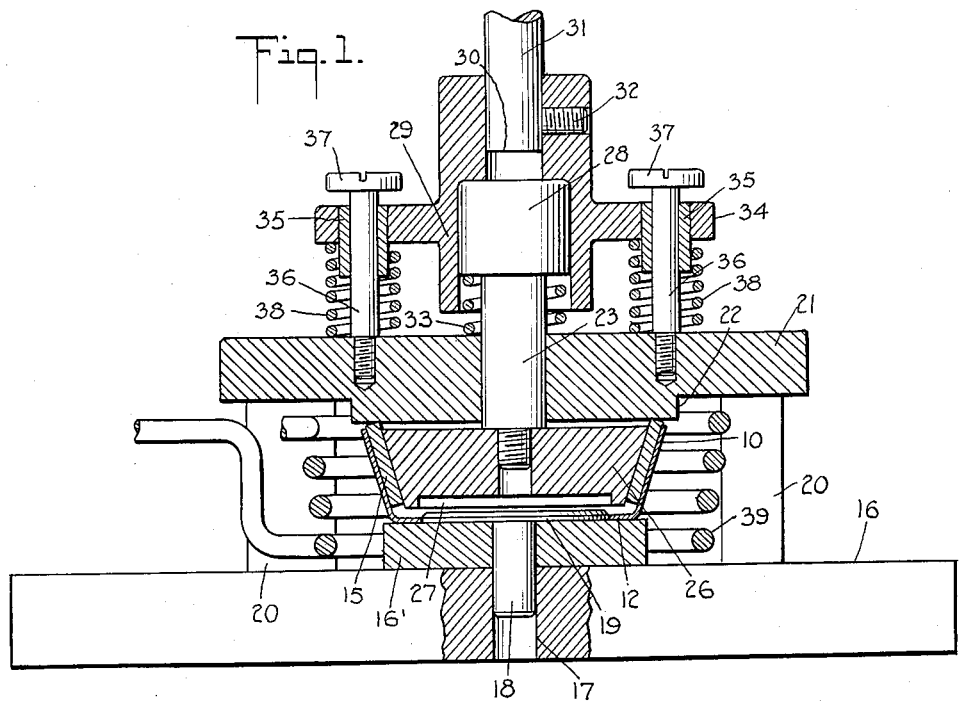
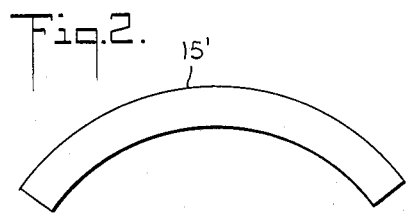
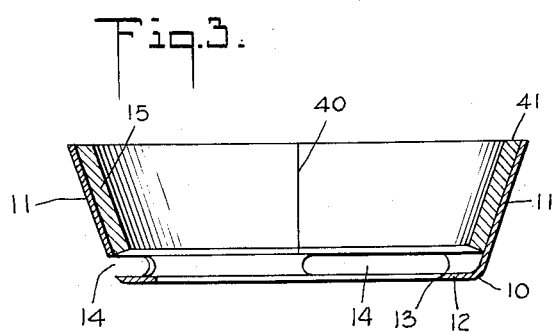
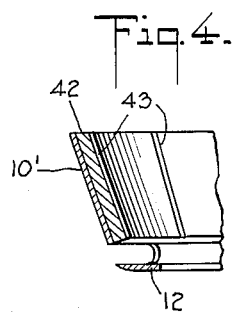
INVENTOR
MELVIN H. EMRICK
BY
*Howard P. Thompson*
ATTORNEY United States Patent Office 2,749,264
Patented June 5, 1956

2,749,264

METHOD OF BONDING FRICTION FACINGS TO CONICAL CUPS

Melvin H. Emrick, Manhasset, N. Y.

Application November 9, 1953, Serial No. 391,052

2 Claims. (Cl. 154—81)

This invention relates to the production of devices such for example as a cup having a friction facing thereon in establishing a drive, as for example in tapping attachments as disclosed in my prior Patent No. 2,613,786, granted October 14, 1952.

Still more particularly, the invention deals in a method of producing devices or cups of the kind under consideration, and in the use of friction materials which will permit operation of the cup or other device in the presence of a lubricating oil.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a diagrammatic sectional view of a fixture illustrating the method of securing a friction facing band to a cup;

Fig. 2 is a plan view of a facing material blank shown in extended position;

Fig. 3 is a sectional view through a cup with the facing material attached thereto; and Fig. 4 is a view similar to Fig. 3 showing only part of the construction and showing a modification.

With many types and kinds of devices having facings or coverings of friction material, difficulty has been experienced in securely supporting the friction material on the device, and in many instances it has been necessary to utilize rivets or similar fasteners countersunk in the surface of the friction material so as to prevent contact with the member engaging the surface of said friction material. This method of procedure has been objectionable from the standpoint of cost and also from the standpoint of reducing the surface area of the friction material. Further, this method of procedure has been objectionable from the standpoint of having the rivets or other fastener devices come in contact with the engaging member as and when the surface of the friction material becomes worn, the latter resulting in marring the surface of the engaging member sometimes to the degree of requiring replacement thereof.

To overcome the objectionable features mentioned above and others, I have provided a simple and economical method of securing a facing material to a device or mounting so as to securely retain the facing material on the mounting and at the same time present on the surface of the facing material a complete uninterrupted or unmarred gripper surface which renders the resulting product more efficient in operation.

Further, I have provided a method wherein the use of certain types and kinds of facing materials will permit operation of the resulting faced product in the presence of lubricating oil without interfering with the drive between the faced member and the member driven thereby.

For the purpose of illustrating one adaptation and use of my invention, I have shown in Figs. 1 and 3 of the drawing a conical cup 10 comprising a flared annular wall 11, at the small diameter end of which is an inwardly extending annular flange 12, the flange 12 forming a large opening 13 in the contracted end of the cup. The cup has adjacent the flange circumferentially spaced elongated apertures 14 which are preferably elongated in structure, as clearly indicated in Fig. 3 of the drawing. At 15 is shown the friction facing secured to the inner surface of the wall 11, the facing being formed from a blank as noted at 15' in Fig. 2 of the drawing, and secured in position in accordance with the method more fully hereinafter described.

In Fig. 1 of the drawing, I have shown diagrammatically a fixture for use in attaching the facing 15 to the cup 10. The fixture comprises a base plate 16 having a central opening 17 in which the pin 18 of an alinement disk 19 is adapted to be arranged, the disk serving to enter the aperture 13 of a cup and to position the cup on the fixture. A spacer disk 16' is also employed for positioning the height of the cup 10 in the fixture. Suitably supported on the base plate 16 are a number of blocks 20 which check downward movement of a pressure plate 21, the plate 21 having a downwardly extending central portion 22 which is adapted to engage the facing ring 15 in movement of said ring into predetermined position upon the inner surface of the cup 10.

The plate 21 has a central aperture, in which a plunger rod 23 is adapted to operate, the rod having a reduced threaded end on which a conical pressure head 26 is mounted. The head 26 has a recess 27 in its lower surface to clear the disk 19. The rod 23 has a head or piston 28 arranged and operating in a cylinder 29, the cylinder having at its upper end an aperture 30 in which a plunger 31 from an air press, not shown, is fixed by a set screw 32. At 33 I have shown a spring disposed between the piston 28 and the plate 21 to provide yieldable movement in the operation of forcing the pressure head 26 into engagement with the friction facing 15.

The cylinder 29 has an annularly extending flange 34 having four circumferentially spaced apertures in which bushings 35 are mounted. Only two of the bushings are shown. It will be apparent, however, that the other two are disposed at right angles to those shown.

Fixed to the pressure plate 21 are pins 36 which operate in the bushings 35, the pins having heads 37 which check upward movement of the cylinder 29 by springs 38 mounted on the pins. In Fig. 1 of the drawing, the several parts are shown in their fully compressed or operating position. It will be apparent, however, that when the plunger 31 moves upwardly it raises sufficiently to give access to the area within the blocks 20 for insertion and removal of the workpiece comprising the cup 10 and the facing 15, after which the plunger is lowered until the pressure plate 21 is checked in its downward movement by seating upon the blocks 20, in which operation the pressure head 26 is held in raised position by the spring 33. This allows the pressure ring to be forced into seated position on the inner surface of the cup 10, after which the plunger is lowered further, in which operation the head 26 is yieldably forced into engagement with the surface of the facing 15 to yieldably force the facing into engagement with the surface of the cup 10. In this latter operation, the flange 34 will be moved out of engagement with the heads 37, as diagrammatically noted in Fig. 1.

The parts 16, 16', 20 and 21 are composed of Transite or similar material, whereas the pressure head 26 is composed of a magnetic material, such for example as steel, and the disk 19 is preferably composed of brass.

Suitably positioned around the cup 10 and within the blocks 20 and slightly conical in arrangement is a coil 39 to supply within the area encircled by the coil heat radiation by induction, the induction coil extending from an induction heating unit known in the art, and for this reason the induction heating unit is not shown. The coil provides heat radiations which extend through the steel cup 10 and also through the pressure head 26, thus heating up the cup and the facing material to establish a secure bond between the facing material and the cup.

In the operation, it will be understood that prior to placing the workpiece in the fixture, the inner surface of the cup 10 and the outer surface of the blank 15', that is to say the surface which will engage the surface of the cup, are first coated with a liquid adhesive, these coatings being applied to both the cup and the facing blank 15, and are allowed to dry for a period of approximately twenty minutes before the facing blank 15' is placed in the cup. This facing material is then set into the cup by hand bringing the ends of the blank 15' into abutting engagement, as for example at 40 in Fig. 3 of the drawing, after which the parts thus assembled are placed in the fixture, and in the initial operation of the fixture the friction ring is first pressed into a firm engagement with the inner surface of the cup 10, the extension 22 engaging the outer edge of the friction ring in this operation, and this also sets or positions the ring in the cup, after which the pressure head 26 engages the inner surface of the friction ring and forces the ring outwardly into firm engagement with the cup, the material of the ring being compressed in this operation.

At this time the induction coil operates to supply the required temperature to establish a bond between the facing ring and the cup, temperatures from 300° F. to 800° F. being employed, and the workpieces are held in this bonding position for a period of from 12 to 25 seconds, whereupon the induction coil is rendered inoperative by a suitable cut-out switch and the parts are held in this position under pressure while cooling takes place for an additional period of approximately 15 seconds. Whereupon the fixture is actuated to raise the pressure head 26 and pressure plate 21, and the friction faced cup is then removed and when fully chilled the facing material can be trimmed or fashioned in any desired manner, trimming being employed primarily to remove the protruding portion of the facing 15 so that a surface 41 in alinement with the edge of the cup is provided, as noted in Fig. 3 of the drawing. It will be understood that when the pressure head 26 is removed from the facing 15 of the cup 10, the previously compressed material of the facing will move inwardly to an extent governed by the material employed in the facing strip.

In the above described bonding operation, the adhesive material employed is melted and fused and establishes a secure adhesion of the facing material to the surface of the cup so that in the use of the cup no relative movement between facing material and cup is experienced. The adhesive material employed is a synthetic thermosetting resin which is dark reddish in color and is not affected by extreme temperatures. It is water, acid and gas resistant. An adhesive or cement of the kind under consideration is identified in the trade by the identification J-1101. It will be understood, however, that other cements having similar properties or characteristics can be used.

While my invention is applicable to securing facing materials of various types and kinds to supporting members, such for example as the cup 10, the type of facing material employed will depend largely upon the use thereof. However, when a friction cup of the kind under consideration is required which operates in oil or under the influence of oil, I employ a facing strip in the form of a compressed cork rubber body which is capable of withstanding the temperatures employed, and which will produce a smooth and finished surface or a surface which can be finished with respect to size and contour.

In some instances it may be desirable to provide on the inner gripping surface of the resulting product a series of circumferentially spaced grooves to change the gripping characteristics of the product. In Fig. 4 of the drawing, I have shown a slight modification wherein a cup 10' generally similar to the cup 10 is employed on which a facing 42 is employed, the facing differing from the friction facing 15 in having a series of circumferentially spaced grooves 43 extending across the inner surface of the facing. The grooves 43 can be formed by providing a head similar to the head 26 fashioned to form the grooves 43 in the setting or bonding operation, it being understood that the material of the facing ring when under the influence of heat is capable of re-forming. It will thus be apparent that in accordance with my method a workpiece of any type or kind, when exposed to the induction heat, can be shaped or molded to a predetermined contour, the parts 10 and 26 becoming mold parts in this operation. In this connection it will also be understood that from the standpoint of the method, the surface of the part 10 can be shaped to any desired contour and the material 15 fashioned to conform to that contour.

In the above described operation of bonding the friction facing 15 with the cup 10, when the cup 10 is heated this cup will expand to a greater degree than the expansion of the facing 15, thus the facing material is pressure held in the expanded cup so that, when the cup chills, the facing 15 becomes circumferentially pressed together to insure a firm bonding and abutment, as at 40, and in fact this abutment at 40 becomes substantially invisible in the finished product.

It will be understood from the foregoing description that the present illustration of producing a friction cup for tapping attachments of the kind under consideration is only illustrative of one adaptation of my invention or method, and the method may be utilized in producing various types and kinds of workpieces which are bonded or formed in accordance with the teachings herein set forth.

Having fully described my invention, what I claim as new and desire to secure by Letters Patent is:

1. The method of producing friction facings on conical cups of the character defined, which comprises applying an adhesive to the inner surface of the cup, applying an adhesive to one surface of a ring of friction material, then arranging said ring with its adhesive surface engaging the adhesive surface of the cup to form a ring on the inner surface of said cup, then subjecting the ring and cup to induction heat and pressure for a predetermined period of time to secure the ring to the cup, then removing the heat, while continuing to hold the ring and cup under pressure for a predetermined cooling period, and then shaping the ring secured to the cup to predetermined contour.

2. The method of producing friction facings on conical cups of the character defined, which comprises applying an adhesive to the inner surface of the cup, applying an adhesive to one surface of a ring of friction material, then arranging said ring with its adhesive surface engaging the adhesive surface of the cup to form a ring on the inner surface of said cup, then subjecting the ring and cup to induction heat of from 300° F. to 800° F. and pressure for a predetermined period of time to shape and secure the ring to the cup, then removing the heat, while continuing to hold the ring and cup under pressure for a predetermined cooling period, and then shaping the ring secured to the cup to predetermined contour.

References Cited in the file of this patent

UNITED STATES PATENTS

| | | |
|---|---|---|
| 1,155,054 | Franz | Sept. 28, 1915 |
| 1,635,411 | Frederick | July 19, 1927 |
| 1,777,829 | Edgecombe | Oct. 7, 1930 |

(Other references on following page)

UNITED STATES PATENTS

| | | |
|---|---|---|
| 1,930,319 | Ocenasek | Oct. 10, 1933 |
| 2,045,453 | Emrick | June 23, 1936 |
| 2,272,532 | Shriver | Feb. 10, 1942 |
| 2,277,602 | Novak | Mar. 24, 1942 |
| 2,316,874 | Kraft | Apr. 20, 1943 |
| 2,377,351 | Martin | June 5, 1945 |
| 2,424,567 | Hill | July 27, 1947 |
| 2,484,656 | Sikka et al. | Oct. 11, 1949 |
| 2,559,747 | Batchelor et al. | July 10, 1951 |
| 2,581,926 | Groten et al. | Jan. 8, 1952 |
| 2,647,556 | Courtney | Aug. 4, 1953 |
| 2,690,246 | Kelleigh | Sept. 28, 1954 |

FOREIGN PATENTS

| | | |
|---|---|---|
| 392,362 | Great Britain | May 18, 1933 |